United States Patent Office 3,198,791
Patented Aug. 3, 1965

3,198,791
NEW SULFANILAMIDO-PYRAZOLES AND
PROCESS OF PREPARING THEM
Rudi Weyer, Frankfurt am Main, Walter Aumüller, Kelkheim, Taunus, Gerhard Korger and Rudolf Fuhsgänger, Frankfurt am Main, and Alfons Häussler, Oberursel, Taunus, Germany, assignors to Farbwerke Hoechst Aktiengesellschaft vormals Meister Lucius & Brüning, Frankfurt am Main, Germany, a corporation of Germany
No Drawing. Filed Apr. 24, 1961, Ser. No. 104,772
Claims priority, application Germany, Apr. 26, 1960,
F 31,083; Feb. 15, 1961, F 33,204
4 Claims. (Cl. 260—239.9)

The present invention relates to new sulfanilamidopyrazoles of the formula

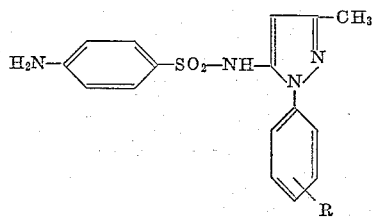

in which R represents a chlorine or bromine atom, the trifluoro-methyl group, an alkyl group having from 1 to 4 carbon atoms or an alkoxy group having from 1 to 4 carbon atoms, to salts of these compounds with inorganic or organic bases and to pharmaceutical preparations containing the novel sulfanilamido-pyrazoles of the salts thereof as active ingredient.

The new compounds of the above-mentioned formula in addition to good chemotherapeutic action show a surprisingly long period of stay in the organism and, therefore, constitute "long acting sulfonamides" excellently suitable for treating bacterial infections.

The present invention likewise relates to the preparation of the new sulfanilamido-pyrazoles of the above-indicated formula and of their corresponding salts which are obtained according to methods which are generally known for the synthesis of such heterocyclic sulfanilamides.

A favorable method of preparing the new sulfanilamido-pyrazoles according to the invention comprises, for instance, reacting a sulfo-halide of the formula

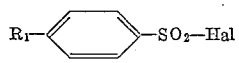

in which $R_1$ represents a radical that may be converted into the amino group, with amino-pyrazoles of the formula

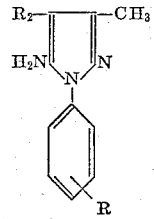

in which R has the meaning given above and $R_2$ represents a hydrogen atom or a radical that may be substituted by hydrogen, converting the group $R_1$ into the amino group, exchanging the radical $R_2$ and/or another sufonyl radical introduced for hydrogen and, if desired, converting the compounds obtained into the corresponding salts by treatment with organic or inorganic bases.

As radicals $R_1$ that may be converted into an amino group there may be used, for example, the nitro group, acylamino groups, as for instance, the acetylamino group or another lower alkyl carboxy acyl group, carbalkoxyamino groups such as the carbethoxyamino group or substituted azo groups.

As radicals $R_2$ exchangeable for hydrogen there is mentioned, for example, the carboxy group.

The starting substances used for the reaction are already known or may be obtained in a simple manner from easily accessible compounds. As sulfo-halide there may be used with special advantage the p-acetylamino - benzene - sulfochloride. Furthermore, para-carbethoxyamino-benzene-sulfochloride, para-nitro-benzenesulfochloride, as well as bis-p, p'-chlorosulfonyl-azobenzene are suitable as starting substances. The corresponding sulfo-bromides may likewise be used.

As 3-amino-pyrazole derivatives there may be mentioned, for example, 3-amino-2-(4'-chlorophenyl)-5-methyl-pyrazole,
3-amino-2-(3'-chlorophenyl)-5-methyl-pyrazole,
3-amino-2-(2'-chlorophenyl)-5-methyl-pyrazole,
3-amino-2-(4'-bromophenyl)-5-methyl-pyrazole, and
3-amino-2-(4'-trifluoromethyl-phenyl)-5-methyl-pyrazole,
3-amino-2-(4'-methoxy-phenyl)-5-methyl-pyrazole,
3-amino-2-(3'-methoxy-phenyl)-5-methyl-pyrazole,
3-amino-2-(2'-methoxy-phenyl)-5-methyl-pyrazole, as well as corresponding 3-amino-2-phenyl-5-methylpyrazoles in which the phenyl rest carries an ethoxy, propoxy or butoxy radical in 2', 3', or 4'-position. Furthermore, 3-amino-2-phenyl-5-methyl-pyrazoles containing in the phenyl nucleus an alkyl group having from 1 to 4 carbon atoms may be used as starting substances, particularly 3-amino-2-(methyl- or ethyl-phenyl)-5-methyl-pyrazoles such as 3-amino-2-(4'-methyl-phenyl)-5-methyl-pyrazole, 3-amino-2-(3'-methyl-phenyl)-5-methyl-yl-pyrazole and 3-amino-2-(4'-ethyl-phenyl)-5-methylpyrazole.

The starting substances are obtained, for instance, by reaction of correspondingly substituted phenyl-hydrazines with diacetonitrile in the presence of aqueous glacial acetic acid.

According to an advantageous method of realizing the process of the invention the starting substances are reacted in the presence of acid binding substances in order to bind the hydrogen halide set free in the course of the reaction. As acid binding agents there may be used, for instance, tertiary amines such as pyridine, quinoline, triethylamine and the like; inorganic acid binding agents such as sodium bicarbonate may, however, likewise be used. The reaction conditions may vary within wide limits and may be adapted to each, individual case. It is of advantage to carry out the reaction in the presence of organic solvents, an excessive amount of the tertiary amine favorably being used as solvent. Inert organic solvents such as benzene, toluene, chloroform, dioxane or tetrahydrofurane are likewise suitable in which case the acid binding agent must be added separately. As reaction temperatures there are suitable temperatures between +20 and +100° C. and even more. When the reaction is terminated, the reaction product obtained is isolated in the usual manner and the substituent $R_1$ is converted into the amino group.

If the radical $R_1$ represents an acylamino group, the acyl radical may be split off by acid or alkaline hydrolysis. If $R_1$ stands for a nitro group or an azo group, these substituents are reductively converted into the amino group.

The products obtained according to the invention may be converted in the usual manner into the corresponding pharmaceutically acceptable salts by treating them with suitable, physiologically tolerable viz. compatible inorganic or organic bases. There are mentioned, for instance, alkali metal hydroxides, alkaline earth metal hydroxides or ammonia; as organic base, for instance, diethylamino ethanol.

The new products show an excellent therapeutic action. If, for instance, mice are infected with a highly active strain of Streptococcus haemolyticus, all animals survive the infection and are completely cured upon oral administration of an average dose of 3 times 625 micrograms/ 20 grams of body weight of mouse of 3-sulfanilamido-2- (4' - methoxy - phenyl) - 5 - methyl - pyrazole. When the known 3-sulfanilamido-2-phenyl-pyrazole is administered under the same conditions, an average dose of three times 1250 micrograms/20 grams of mouse is required for curing the animal completely.

In addition thereto, the products of the invention stay for a prolonged time in the organism and may, therefore, be used, for instance, as "long acting sulfonamides" in the treatment of bacterial infections.

The following table shows the sulfonamide blood level in milligrams per milliliter ascertained by tests on mice effected with the new 3-sulfanilamido-2-(4'-chlorophenyl)-5-methyl-pyrazole in comparison with the corresponding data obtained by using the known 3-sulfanilamido-2-phenyl-pyrazole. For the examination mice showing an average weight of 20 grams were used which were given each, per os, 15 milligrams of the test preparations in the form of an aqueous solution of the corresponding sodium salts. After 8 and after 14.5 hours a small amount of blood was taken from the animals and the sulfonamide concentration was determined. The table shows the average values of 3 blood samples in each case.

TABLE

| Compound Dose: 15 milligrams/20 grams of body weight per os | Blood level after 8 hours, mg./ml. | (Average values from 3 samples) after 14.5 hours, mg./ml. |
| --- | --- | --- |
| (I) 3-sulfanilamido-2-(4'-chlorophenyl)-5-methyl-pyrazole | 0.36 | 0.38 |
| (II) 3-sulfanilamido-2-phenyl-pyrazole | 0.25 | 0.32 |

It can be seen from the test results contained in the table that the new product of the invention (I) is superior to the known compound (II) as regards the period of stay in the organism.

Likewise as regards bacteriostatic efficiency, the new compound (I) is distinctly superior to the known product (II). For example, the lowest dose of compound I causing bacteriostatic efficiency against Streptococcus haemolyticus amounts to 40 micrograms/milliliter, whereas the corresponding value of the compound (II) amounts to about 62.5 micrograms/milliliter.

The results ascertained in animal tests can be confirmed by clinical tests in humans.

The product of the invention are preferably used for the production of pharmaceutical preparations to be orally or parenterally administered and showing chemotherapeutic action (treatment of infectious diseases). For the production of the solid or liquid preparations, carrier substances and auxiliaries are used which do not react with the active substance, for instance water, lactose, starch, gelatine, magnesium stearate, vegetable oils, talc, tragacanth, and the like; as preparation forms there are suitable, for instance, tablets, capsules, dragées, solutions or suspensions. Moreover, the products of the invention may be used, preferably in the form of their salts, with non-toxic bases, for instances as sodium salts, for the preparation of injection solutions. The products are preferably applied per os in the form of tablets or dragées, each tablet containing about 0.5 gram of one of the new products of the invention or of a mixture of several new compounds as active ingredients. The initial dose administered to adult patients amounts to about two times 1.0 gram per day and the permanent dose administered until the infection disappears amounts to about 1.0 gram per day, whereas the doses administered to juvenile persons are lower.

The following examples serve to illustrate the invention but they are not intended to limit it thereto:

EXAMPLE 1

*3-sulfanilamido-2-(4'-methoxyphenyl)-5-methyl-pyrazole*

18 grams of 3-amino-2-(4'-methoxyphenyl)-5-methyl-pyrazole having a melting point of 94–96° C. (prepared by reaction of 4-methoxy-phenyl-hydrazine with diacetonitrile in aqueous glacial acetic acid) are heated for 1 hour with 25 grams of acetyl-sulfanilic acid chloride in 50 cc. of pyridine on the steam bath. After cooling, the reaction mixture is poured into acidified water, the separated half-solid product is heated with 200 cc. of 2 N-sodium hydroxide solution for 3 hours on the water bath and the forming solution is clarified with charcoal. The filtrate is cooled, acidified with acetic acid and the separated precipitate is recrystallized twice from aqueous ethanol. The 3-sulfanilamido-2-(4'methoxyphenyl)-5-methyl-pyrazole thus obtained melts at 189–191° C.

EXAMPLE 2

*3-sulfanilamido-2-(3'methoxyphenyl)-5-methyl-pyrazole*

According to the method described in Example 1 there is obtained by reaction of 40 grams of 3-amino-2-(3'-methoxyphenyl)-5-methyl-pyrazole melting at 98–104° C. (prepared by reaction of 3-methoxyphenyl-hydrazine with diacetonitrile in aqueous glacial acetic acid) and 50 grams of acetylsulfanilic acid chloride in 100 cc. of pyridine the 3 - sulfanilamido-2-(3'-methoxyphenyl)-5-methyl-pyrazole. After having been recrystallized twice from aqueous ethanol the compound melts at 202–204° C.

EXAMPLE 3

*3-sulfanilamido-2-(4'-ethoxyphenyl)-5-methyl-pyrazole*

30 grams of 3-amino-2-(4'-ethoxyphenyl)-5-methylpyrazole melting at 80–81° C. (prepared by reaction of 4-ethoxyphenyl-hydrazine with diacetonitrile in aqueous glacial acetic acid) are heated for 1 hour on the steam bath with 34 grams of acetyl-sulfanilic acid chloride in 75 cc. of pyridine. The reaction mixture is cooled, introduced into acidified water and after separation of the mother liquid the product obtained is heated with 250 cc. of 2 N-sodium hydroxide solution for 3 hours on the water bath. After clarification with charcoal the mixture is filtered, the filtrate is acidified by means of acetic acid and the precipitate is recrystallized twice from aqueous ethanol. Melting point: 195–197° C.

EXAMPLE 4

*3-Sulfanilamido-2-(4'-methylphenyl)-5-methyl-pyrazole*

18.7 grams of 3-amino-2-(4'-methylphenyl)-5-methyl-pyrazole (melting point 117–120° C., prepared by reaction of 4-methylphenyl-hydrazine and diacetonitrile) are introduced into 50 cc. of pyridine and 25 grams of acetyl-sulfanilic acid chloride are added thereto. The mixture is heated for 1 hour on the steam bath, allowed to cool and the reaction mixture is then introduced into acidified water. The separated product is filtered off with suction and heated for 3 hours on the steam bath with 200 cc. of 2 N-sodium hydroxide solution. It is filtered with addition of charcoal and the cooled solution is acidified by means of acetic acid. The separated precipitate is filtered off with suction and recrystallized twice from aqueous ethanol. The 3 - sulfanilamido - 2 - (4'-methylphenyl)-5-methyl-pyrazole thus obtained melts at 205–206° C.

EXAMPLE 5

*3-sulfonilamido-2-(4'-chlorophenyl)-5-methyl-pyrazole*

21 grams of 3-amino-2-(4'-chlorophenyl)-5-methylpyrazole (prepared from 4-chlorophenyl-hydrazine and diacetonitrile, melting point 109–111° C.) are introduced into acidified water. The separated 3-acetyl-sulfanilaacid chloride are added. The mixture is heated for 1 hour on the steam bath, allowed to cool and introduced into acidified water. The separated 3-acetyl-sulfanilamido-2-(4'-chlorophenyl)-5-methyl-pyrazole is filtered off with suction and heated with 200 cc. of 2 N-sodium hydroxide solution for 3 hours on the steam bath. The mixture is filtered with addition of charcoal and the cooled solution is acidified by means of acetic acid. The separated precipitate is filtered off with suction and recrystallized from a mixture of ethanol and water. The 3-sulfanilamido - 2 - (4'-chlorophenyl)-5-methyl-pyrazole obtained melts at 193–195° C.

EXAMPLE 6

*3-sulfanilamido-2-(3'-chlorophenyl)-5-methyl-pyrazole*

21 grams of 3-amino-2-(3'-chlorophenyl)-5-methyl-pyrazole (melting point 138–139° C., prepared from 3-chlorophenyl-hydrazine and diacetonitrile) are combined with 50 cc. of pyridine and 25 grams of acetyl-sulfanilic acid chloride, heated for 1 hour on the steam bath and further treated as described in Example 1. There is thus obtained the 3-sulfanilamido-2-(3'-chlorophenyl)-5-methylpyrazole showing a melting point of 223–224° C.

EXAMPLE 7

*3-sulfanilamido-2-(2'-chlorophenyl)-5-methyl-pyrazole*

10.5 grams of 3-amino-2-(2'-chlorophenyl)-5-methyl-pyrazole are reacted with 12.5 grams of acetylsulfanilic acid chloride and 20 cc. of pyridine as described in Example 1. The reaction product is hydrolysed by means of 100 cc. of 2 N-sodium hydroxide solution and treated accordingly. The 3-sulfanilamido-2-(2'-chlorophenyl)-5-methyl-pryazole thus obtained melts at 219–221° C.

EXAMPLE 8

*3-sulfanilamido-2-(4'-bromophenyl)-5-methyl-pyrazole*

To 9.5 grams of 3-amino-2-(4'-bromophenyl)-5-methyl-pyrazole (melting point 104–105° C., prepared from 4-bromophenyl-hydrazine and diacetonitrile) in 20 cc. of pyridine there are added 10 grams of acetyl-sulfanilic acid chloride and after short standing the mixture is heated for 1 hour on the steam bath. The batch is cooled, poured into acidified water, after crystallization the product is filtered off with suction and heated with 80 cc. of 2 N-sodium hydroxide solution for 3 hours on the steam bath. The mixture is filtered with addition of charcoal and acidified with acetic acid. The 3-sulfanilamido-2-(4'-bromophenyl)-5-methyl-pyrazole filtered off with suction and recrystallized from a mixture of ethanol and water melts at 192–194° C.

EXAMPLE 9

*3-sulfanilamido-2-(4'-trifluoro-methylphenyl)-5-methyl-pyrazole*

To 12 grams of 3-amino-2-(4'-trifluoro-methylphenyl)-5-methyl-pyrazole (melting point 132–134° C., prepared from 4-(trifluoromethyl)-phenyl-hydrazine and diacetonitrile) in 30 cc. of pyridine there are added 12.5 grams of acetylsulfanilic acid chloride and the mixture is then heated for 1 hour on the steam bath. After short cooling the batch is poured into acidified water and the product filtered off with suction after crystallization is heated with 100 cc. of 2 N-sodium hydroxide solution for 3 hours on the steam bath. The substance is worked up as described in Example 1 and after recrystallization from a mixture of ethanol and water the 3-sulfanilamido-2-(4'-trifluoromethylphenyl)-5-methyl-pyrazole is obtained which melts at 195–197° C.

EXAMPLE 10

*3-sulfanilamido-2-(3'-trifluoromethylphenyl)-5-methyl-pyrazole*

24 grams of 3-amino-2-(3'-trifluoromethylphenyl)-5-methyl-pyrazole melting at 103–105° C. (prepared by reaction of 3-trifluoromethylphenyl-hydrazine with diacetonitrile in glacial acetic acid) are heated with 25 grams of acetylsulfanilic acid chloride in 60 cc. of pyridine for 1 hour on the water bath. The cooled reaction mixture is poured into water and acidified by means of hydrochloric acid. The excessive liquid is poured off and the residue is heated with 200 cc. of 2 N-sodium hydroxide solution. The forming solution is filtered hot with addition of charcoal and after cooling the filtrate is acidified by means of acetic acid. The precipitated product is recrystallized twice from aqueous dimethyl-formamide and there is thus obtained the 3-sulfanilamido-2-(3'-trifluoromethylphenyl)-5-methyl-pyrazole which melts at 261–263° C.

We claim:

1. A member selected from the group consisting of sulfanilamido pyrazoles of the formula

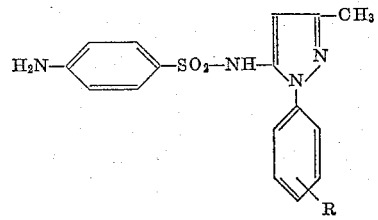

in which R is a member selected from the group consisting of chlorine and alkoxy of 1–4 carbon atoms, and the salts of physiologically tolerable bases of said pyrazoles.

2. 3 - sulfanilamido - 2-(4'-methoxy-phenyl)-5-methyl-pyrazole.

3. 3 - sulfanilamido - 2 - (4'-chloro-phenyl)-5-methyl-pyrazole.

4. 3 - sulfanilamido - 2 - (3'-chloro-phenyl)-5-methyl-pyrazole.

References Cited by the Examiner

UNITED STATES PATENTS

| 2,858,309 | 10/58 | Druey et al. | 260—239.9 |
| 2,890,984 | 6/59 | Sahyun | 167—65 |
| 2,955,073 | 10/60 | Beer | 167—65 |
| 2,988,547 | 6/61 | Achelis et al. | 260—239.9 |
| 2,997,467 | 8/61 | Cox et al. | 260—239.9 |
| 3,014,038 | 12/61 | Druey | 260—310 |

FOREIGN PATENTS

| 204,033 | 6/59 | Austria. |
| 1,094,265 | 12/60 | Germany. |
| 738,999 | 10/55 | Great Britain. |
| 743,505 | 1/56 | Great Britain. |

OTHER REFERENCES

Bell: "Journ. Chem. Soc." (London) (1941), pages 285–7.

Yale: "Journ. of Medical and Pharmaceutical Chemistry," vol. 1, No. 2, pages 122–133 (1959).

WALTER A. MODANCE, *Primary Examiner.*

IRVING MARCUS, NICHOLAS S. RIZZO, *Examiners.*